(12) United States Patent
Miyake et al.

(10) Patent No.: US 7,317,485 B1
(45) Date of Patent: Jan. 8, 2008

(54) DIGITAL STILL CAMERA WITH COMPOSITION ADVISING FUNCTION, AND METHOD OF CONTROLLING OPERATION OF SAME

(75) Inventors: Izumi Miyake, Asaka (JP); Takashi Soga, Asaka (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 09/525,902

(22) Filed: Mar. 15, 2000

(30) Foreign Application Priority Data

Mar. 15, 1999 (JP) ................................. 11-67890
Sep. 28, 1999 (JP) ................................ 11-273552

(51) Int. Cl.
*H04N 5/222* (2006.01)

(52) U.S. Cl. .............................. 348/333.02; 348/333.11

(58) Field of Classification Search ........... 348/333.01, 348/333.02, 333.04, 333.03, 333.05, 333.06, 348/333.07, 333.08, 333.09, 333.1, 333.11, 348/333.12, 333.13; 345/709, 705, 707, 345/763, 708

See application file for complete search history.

(56) References Cited

U.S. PATENT DOCUMENTS 5,873,007 A * 2/1999 Ferrada Suarez ........... 396/296
5,978,016 A * 11/1999 Lourette et al. ....... 348/333.02
6,128,013 A * 10/2000 Prabhu et al. .............. 345/337
6,177,958 B1 * 1/2001 Anderson ................... 348/362
6,344,907 B1 * 2/2002 Watanabe et al. ........... 358/448
6,522,354 B1 * 2/2003 Kawamura et al. ...... 348/231.2
6,606,117 B1 * 8/2003 Windle ....................... 348/239
6,608,650 B1 * 8/2003 Torres et al. .......... 348/333.02
7,038,724 B2 * 5/2006 Satoh et al. ........... 348/333.05

FOREIGN PATENT DOCUMENTS

JP           10-243274           9/1998

* cited by examiner

*Primary Examiner*—Lin Ye
*Assistant Examiner*—Justin P Misleh
(74) *Attorney, Agent, or Firm*—Birch, Stewart, Kolasch & Birch, LLP

(57) ABSTRACT

A digital still camera is designed so that even a beginner can acquire photographic technique. To this end, picture-taking advice conforming to the subject of photography is displayed, in a shooting mode, on the display screen of a liquid crystal display device with which the camera is provided. By viewing the displayed picture-taking advice, the user becomes aware of the essentials of photography. The user is prevented from making picture-taking errors by shooting in accordance with the picture-taking advice.

36 Claims, 16 Drawing Sheets

*Fig. 3*

```
SET UP

COMPRESSION RATE      : NORMAL
NUMBER OF PIXELS      : 1280 × 1024

┌─────────────────────────────┐
│ PICTURE-TAKING ADVICE: ON   │ ～31
└─────────────────────────────┘

DATE                  : SET
RESET                 : EXECUTE
```
9

*Fig. 11*

```
SET UP

COMPRESSION RATE                  : NORMAL
NUMBER OF PIXELS                  : 1280 × 1024
                                                 31A
PICTURE-TAKING ADVICE(BEGINNER)       : ON
PICTURE-TAKING ADVICE(INTERMEDIATE): ON
                                                 31B
DATE                              : SET
RESET                             : EXECUTE
```
9

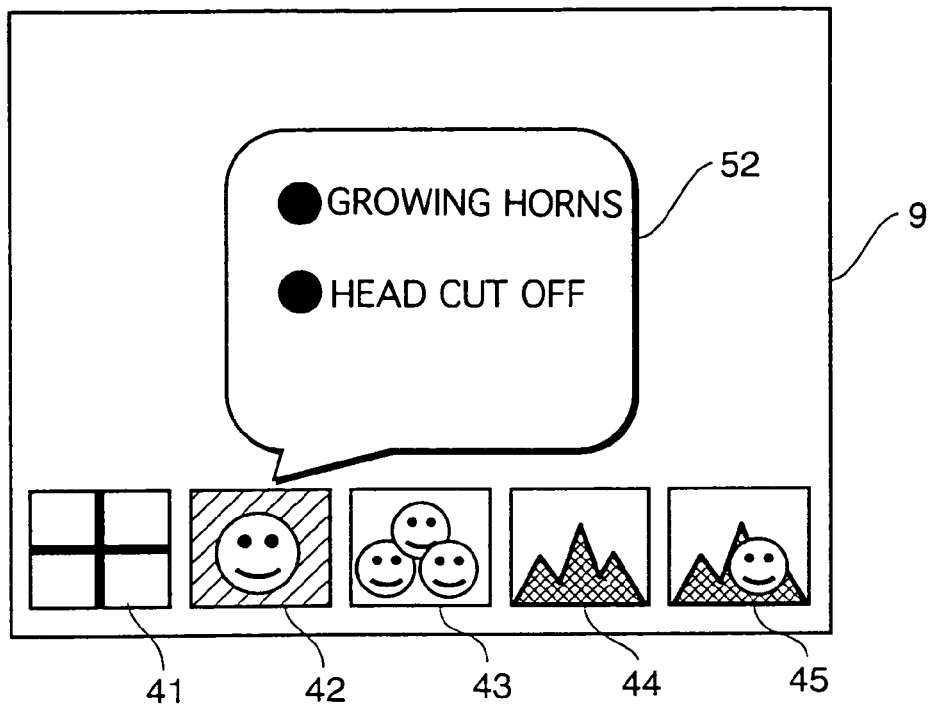
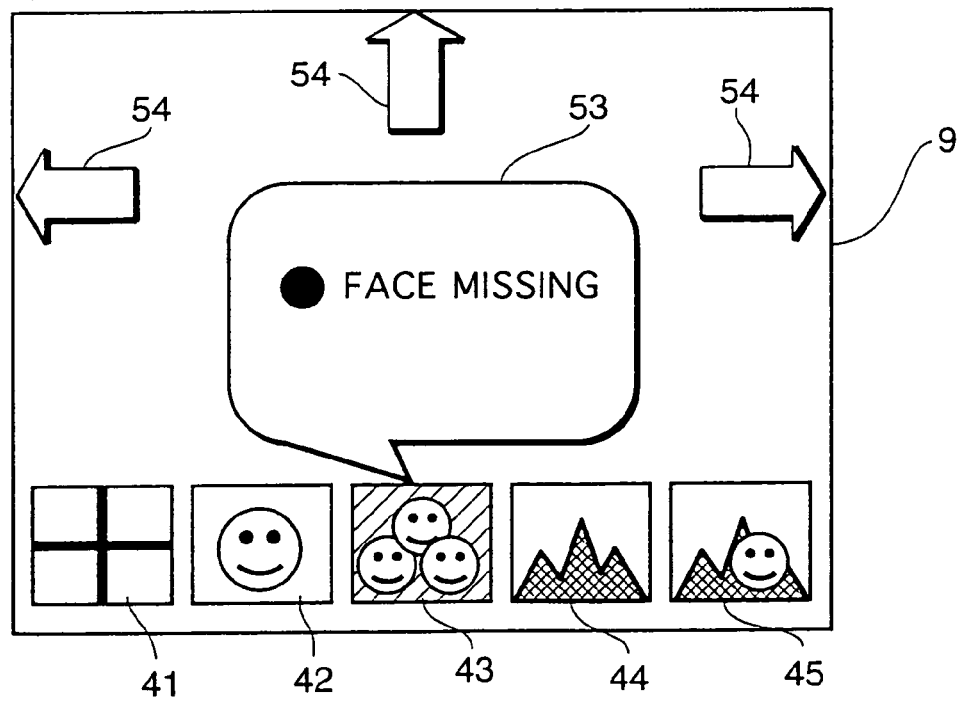

| ADVICE MODE | ADVICE CODE |
|---|---|
| PORTRAIT PICTURE-TAKING ADVICE | 01H |
| GROUP PICTURE-TAKING ADVICE | 02H |
| SCENIC ADVICE | 03H |
| PICTURE-TAKING ADVICE ON COMBINATION OF SCENERY AND PEOPLE | 04H |

DIGITAL STILL CAMERA WITH COMPOSITION ADVISING FUNCTION, AND METHOD OF CONTROLLING OPERATION OF SAME

BACKGROUND OF THE INVENTION

1. Field of the Invention

This invention relates to a digital still camera equipped with a display unit for displaying the image of a subject and to a method of controlling operation of the camera.

2. Description of the Related Art

When a beginner takes a picture, poor composition may be the result, as when a picture is composed with the horizon cutting across the neck of an individual who is the main subject of the photo or with vertical lines in the background seeming to emerge from the head of the individual. There are also camera users who capture the image of a subject at an angle because of the particular way they hold the camera.

Thus, a beginner who is not accustomed to taking pictures with a camera does not possess a skilled photographic technique.

DISCLOSURE OF THE INVENTION

Accordingly, an object of the present invention is to improve the photographic technique of a beginner who is not accustomed to taking pictures.

According to the present invention, the foregoing object is attained by providing a digital still camera equipped with a composition advising function, comprising: an imaging unit for sensing the image of a subject and outputting image data representing the image of the subject; a display unit for displaying the image of the subject represented by the image data output from the imaging unit; a display controller (display control means) for controlling the display unit so as to display advice on composition for the purpose of taking a picture of the subject; and a recording controller responsive to depression of a shutter-release button for recording the image data, which is output from the imaging unit, on a recording medium.

The present invention provides also an operation control method suited to the apparatus described above. Specifically, the present invention provides a method of controlling operation of a digital still camera equipped with a composition advising function, the camera having an imaging unit for sensing the image of a subject and outputting image data representing the image of the subject, a display unit for displaying the image of the subject represented by the image data output from the imaging unit, and a recording controller responsive to depression of a shutter-release button for recording the image data, which is output from the imaging unit, on a recording medium, the method including a step of controlling the display unit so as to display advice on composition for the purpose of taking a picture of the subject.

In accordance with the present invention, the image of a subject is displayed on the display unit. The aforementioned advice for composing the picture also is displayed on the display unit.

The user decides the composition of the subject while following the advice being displayed on the display unit. Even a beginner, therefore, can be prevented from making an error in composition. By repeating photography while following the advice, even a beginner can acquire a variety of photographic techniques.

The camera may further include a display command switch for applying a command to display the aforesaid advice. In such case the display controller displays the advice on the display unit in response to the display command applied by the display command switch.

The advice can be displayed only when necessary. Thus, it can be so arranged that bothersome advice is not displayed for a user who has acquired photographic technique.

The camera may further include an icon display controller (icon display control means) for controlling the display unit in such a manner that an icon representing the image of a subject that is applicable to a composition is displayed in association with the advice.

By observing the icon, the user can tell to what composition the displayed advice applies.

The camera may further include a device for setting a photographic skill level. In this case the display controller causes the display unit to display advice, which conforms to the photographic skill level set by the skill level setting device, from among advice that difference for each photographic skill level.

Thus, advice that conforms to the photographic skill level of the user can be displayed. This makes it possible for the camera to accommodate users having a variety of photographic skill levels.

Data representing the advice may be recorded on the recording medium in correlation with the image data. As will be described later, the advice can be displayed together with the image of the subject when the image of the subject is reproduced.

An image reproducing apparatus according to the present invention comprises: a reading unit for reading advice data and image data from a recording medium, wherein the advice data represents advice regarding composition for the purpose of taking a picture of a subject and the image data represents the image of the subject, the advice data and the image data being recorded on the recording medium in correlation with each other; a first display controller (first display control means) for controlling a display unit in such a manner that the image of the subject, which is represented by the image data that has been read by the reading unit, is displayed on a display screen of the display unit; and a second display controller (second display control means) for controlling the display unit in such a manner that advice indicated by the advice data that has been read by the reading unit is displayed on the display screen.

The present invention provides also a method suited to the apparatus described above. Specifically, the method comprises the steps of reading advice data and image data from a recording medium, wherein the advice data represents advice on composition for the purpose of taking a picture of a subject and the image data represents the image of the subject, the advice data and the image data being recorded on the recording medium in correlation with each other; and displaying the image of the subject, which is represented by the image data that has been read, and advice indicated by the advice data that has been read, on a display screen of the display unit.

In accordance with the present invention, the advice data and the image data are recorded on the recording medium in correlation with each other. When the advice data and image data are read from the recording medium, the image of the subject represented by the image data and the advice represented by the advice data are displayed on the display screen of the display unit.

By observing the advice displayed on the display screen, the user can tell that the image of the subject being displayed has been captured in accordance with the advice.

Preferably, whether the displayed image of a subject has been captured with a composition that is in accordance with the advice is determined and a warning is issued in response to a determination to the effect that the image of the subject has not been captured with a composition that is in accordance with the advice.

Thus, when a picture has not been captured with a composition in accordance with the advice, a warning is issued. If a picture has not been captured with the desired composition, therefore, the subject can be re-photographed as necessary.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3 to 8 show examples of images displayed on a display screen of a liquid crystal display device;

FIG. 11 shows an example of a display screen of the liquid crystal display device;

DESCRIPTION OF THE PREFERRED EMBODIMENTS (1) First Embodiment

Figure 1:
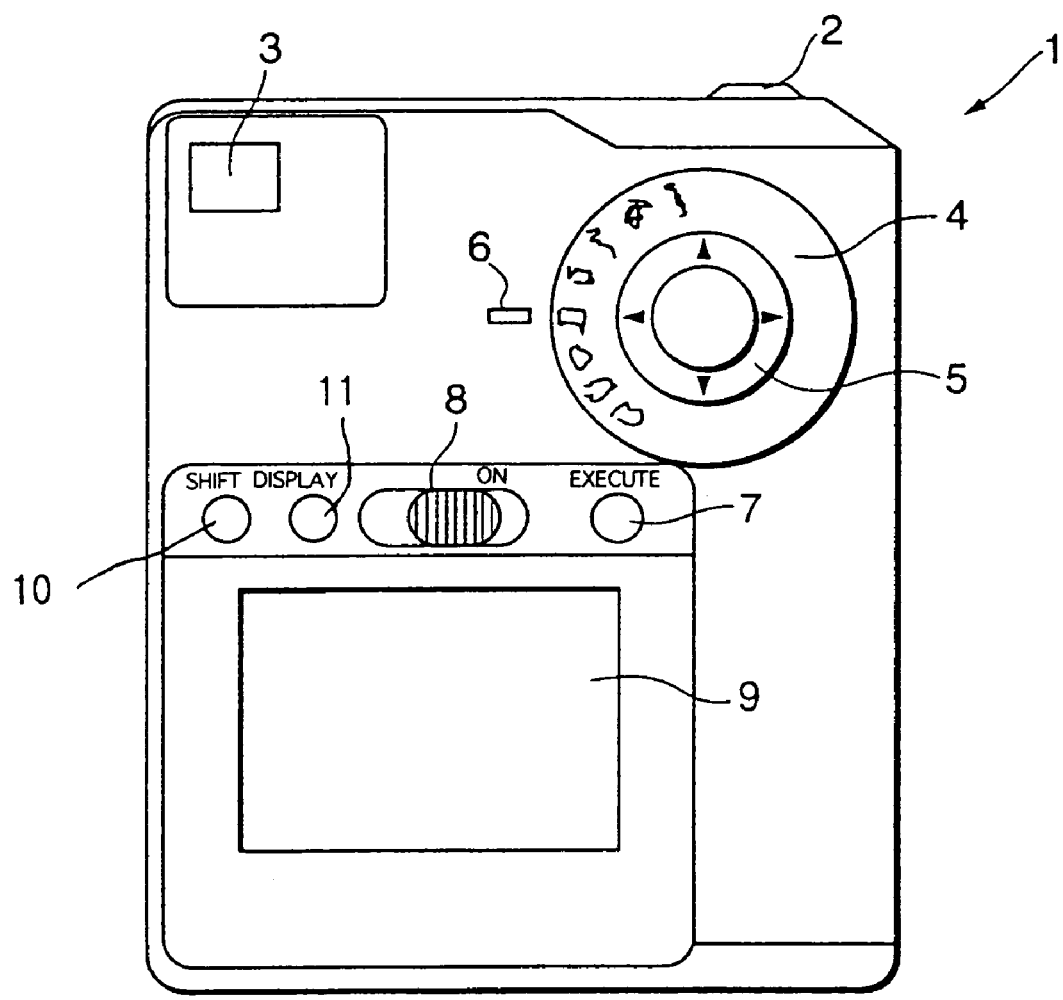
FIG. 1 is a back view of a digital still camera.

FIG. 1 is a back view of a digital still camera 1 according to a first embodiment of the present invention.

A shutter-release button 2 is disposed on the top of the digital still camera 1 on the right side thereof. The shutter-release button 2 is capable of being pressed through first and second stroke lengths.

The back of the digital still camera 1 is formed to have an optical viewfinder 3 at the upper left corner thereof.

The back side of the digital still camera 1 is provided at its upper right corner with a mode setting dial 4 for setting a set-up mode, a shooting mode, a playback mode and other modes. An index mark 6 is at the left side of the mode setting dial 4. The mode setting dial 4 is capable turning freely. A desired mode among the various modes formed on the mode setting dial 4 is set by positioning the desired mode at the index mark 6.

An up, down, left, right button 5 is formed within the mode setting dial 4, and the button 5 is formed to have up, down, left and right arrows. Each arrow mark is capable of being pressed as an individual button.

A liquid crystal display device 9 is provided on the back of the digital still camera 1 on the lower side thereof and displays the image of a subject obtained by imaging.

Various operating buttons are formed on the display screen of the liquid crystal display device 9. The operating buttons include a shift button 10, a display button 11, a power switch 8 and an execute button 7.

Figure 2:
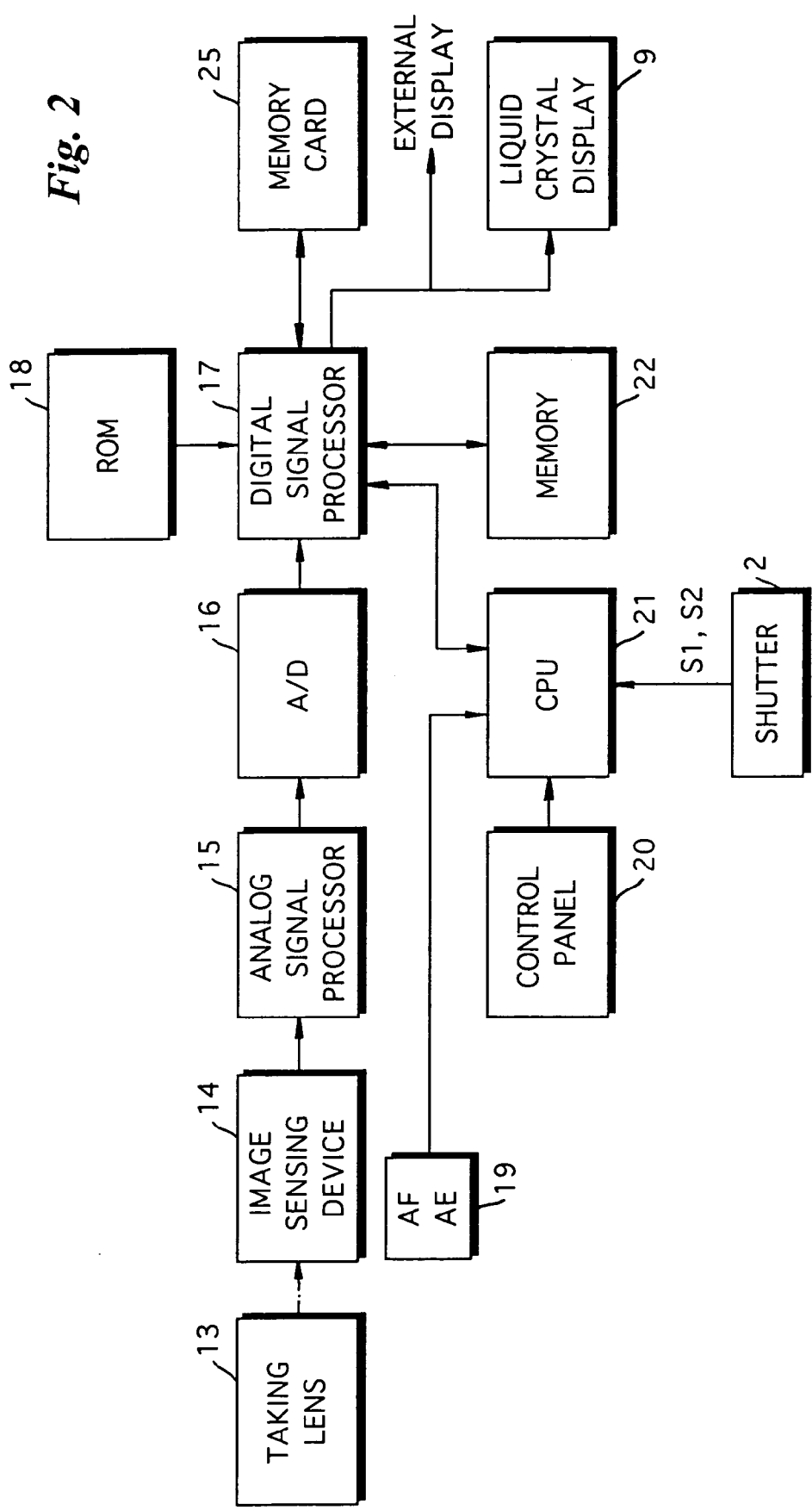
FIG. 2 is a block diagram illustrating the electrical construction of a digital still camera according to the present invention.

FIG. 2 is a block diagram illustrating the electrical construction of the digital still camera 1.

The overall operation of the digital still camera 1 is controlled by a CPU 21.

Signals S1 and S2 indicative of depression of the shutter-release button 2 through its first and second stroke lengths, respectively, enter the CPU 21 from the shutter-release button 2. Also input to the CPU 21 are signals indicating operating commands from a control panel 20 including the operating buttons, which include the shift button 10, display button 11, power switch 8 and execute button 7, and the mode setting dial 4 and up, down, left, right button 5.

The digital still camera 1 is capable of autofocus and auto exposure adjustments. An AF and AE circuit 19 is provided for this purpose. If the shutter-release button 2 is pressed through its first stroke length, autofocus and auto exposure adjustments are made by the AF and AE circuit 19. AF and AE signals from the AF and AE circuit 19 are input to the CPU 21.

The image of a subject is formed on the photoreceptor surface of an image sensing device 14 by a taking lens 13. An analog video signal representing the image of the subject is output from the image sensing device 14 and enters an analog video signal processing circuit 15.

The analog video signal processing circuit 15 executes analog signal processing such as a gamma correction and white balance adjustment. The video signal output from the analog video signal processing circuit 15 enters an analog/digital conversion circuit 16, which converts the signal to digital image data. The latter is input to a digital signal processing circuit 17.

The image data that is input to the digital signal processing circuit 17 undergoes digital signal processing such as processing for the generation of luminance and color difference data. Image data output from the digital signal processing circuit 17 is applied to the liquid crystal display device 9. Thus the image of the subject is displayed on the display screen of the liquid crystal display device 9.

If the shutter-release button 2 is pressed through its second stroke length, the image data output from the digital signal processing circuit 17 is applied to a memory 22, where the data is stored temporarily. The image data is read out of the memory 22 and input to the digital signal processing circuit 17. The image data is compressed in the digital signal processing circuit 17 and then applied to a memory card 25. The image data thus compressed is recorded on the memory card 25.

The digital still camera 1 contains a ROM 18 in which data representing picture-taking advice has been stored.

The digital still camera 1 has a playback function as well. If the playback mode is set by the mode setting dial 4, the compressed image data that has been recorded on the memory card 25 is read. The compressed image data that has been read is expanded in the digital signal processing circuit 17. The expanded digital image data is then applied to the liquid crystal display device 9, where the reproduced image is displayed on the display screen of the liquid crystal display device 9.

Figure 9:
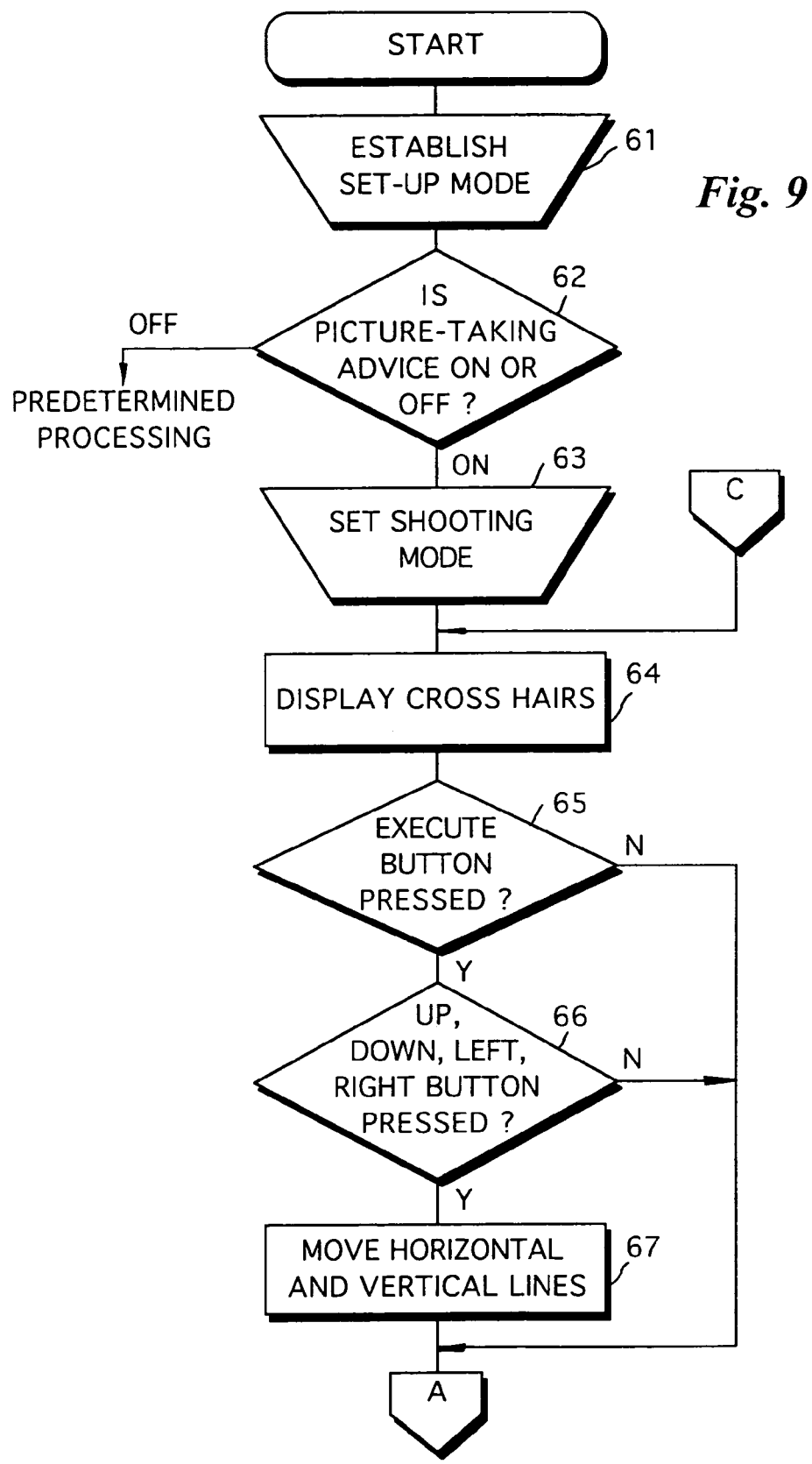
FIGS. 9 and 10 are flowcharts illustrating the processing procedure of the digital still camera.
Figure 10:
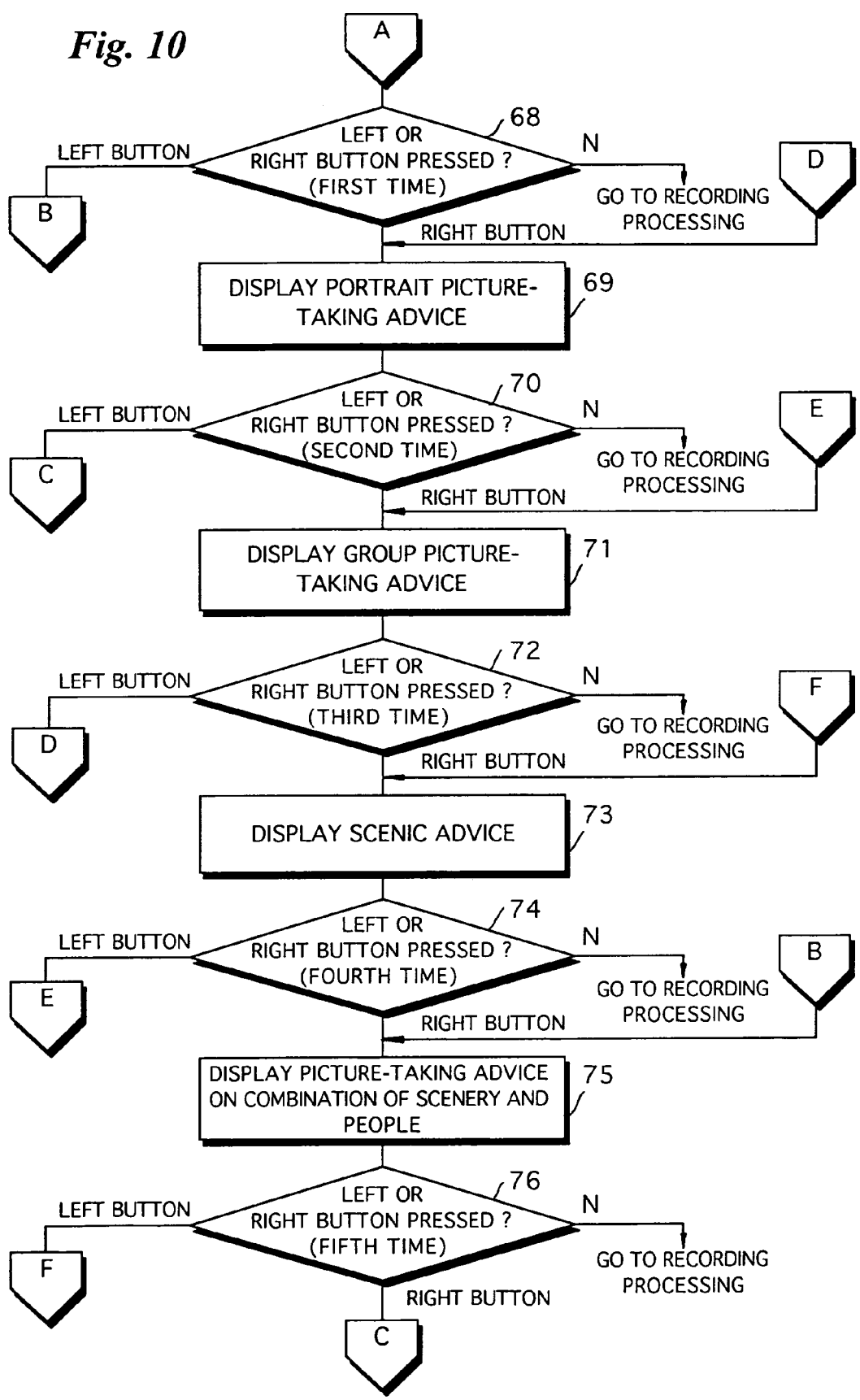

FIGS. 3 through 8 illustrate examples of images displayed on the liquid crystal display device 9. FIGS. 9 and 10 are flowcharts illustrating processing executed by the digital still camera 1.

The user turns the mode setting dial 4 to set the set-up mode (step 61). When the set-up mode is set, a set-up image shown in FIG. 3 is displayed on the display screen of the liquid crystal display device 9.

The set-up image includes an item for setting compression rate, an item which displays the number of pixels, an item for setting picture-taking advice, an item for setting the date, and an item for designated reset. When the set-up image is being displayed on the liquid crystal display device 9, a setting window 31 is moved up and down between items by pressing the up button or down button on the up, down, left, right button 5. Whenever the left button or right button is pressed while the setting window 31 is enclosing the picture-taking advice, the picture-taking advice is switched on and off. Settings are entered by pressing the execute button 7. Here it is assumed that the picture-taking advice has been turned on (step 62).

Figure 4:
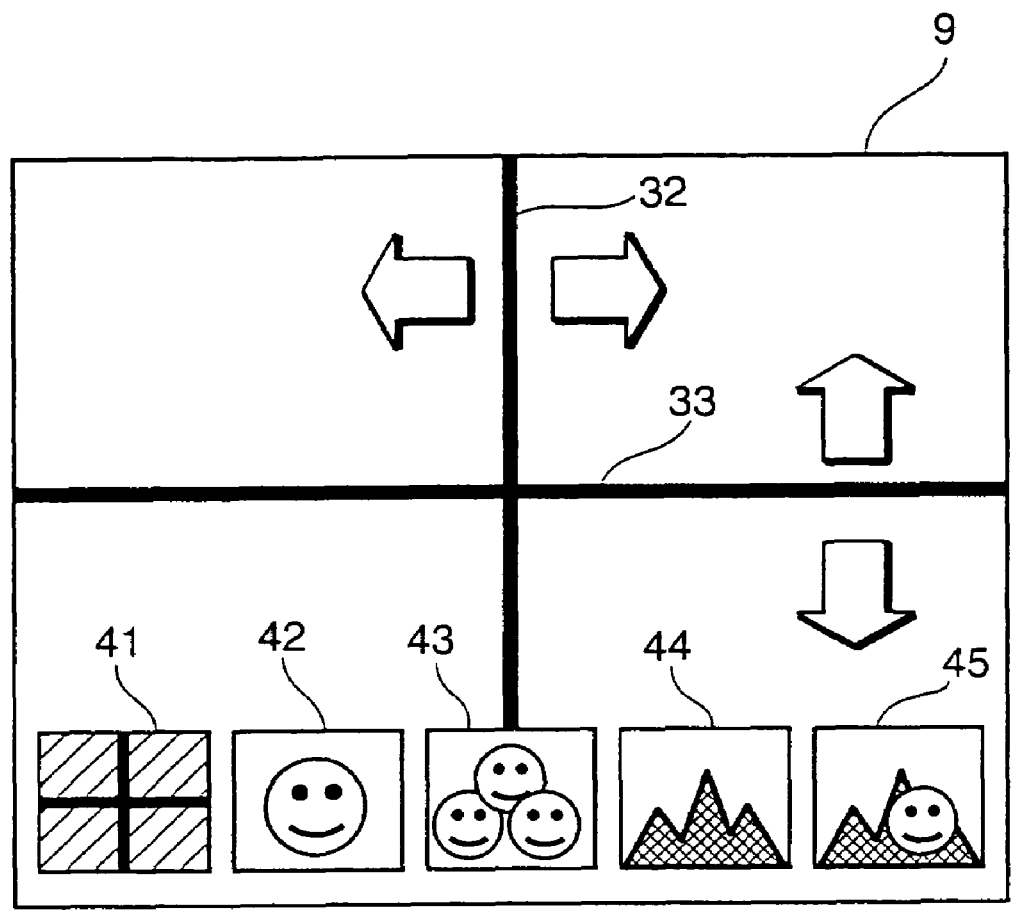

The user turns the mode setting dial 4 to shift from the set-up mode to the shooting mode (step 63). When the shooting mode is established, a subject is imaged by the image sensing device 14 and the image of the subject is displayed on the display screen of the liquid crystal display device 9. As shown in FIG. 4, cross hairs (which are composed of a vertical line 32 and a horizontal line 33) are displayed on the image of the subject (step 64). Icons 41 to 45 are displayed at the bottom of liquid crystal display device 9.

Icons 41, 42, 43, 44 and 45 represent cross hairs, the face of single person, the faces of several persons, mountains and the face of a person together with a mountain, respectively.

An icon among the icons 41 to 45 that corresponds to picture-taking advice displayed on the liquid crystal display device 9 is lit (indicated by the hatching in FIG. 4) so as to distinguish it from the other icons.

By aligning a vertical or horizontal portion of the subject in the picture-taking area with the cross hairs, it is possible to prevent the photographic image from being tilted at an angle to the left or right.

If, while the cross hairs are being displayed, the execute button 7 is pressed (step 65) and the up, down, left, right button 5 is pressed (step 66), the vertical line 32 and horizontal line 33 constituting the cross hairs are moved in the direction in which the up, down, left, right button 5 was pressed (step 67). The vertical line 32 moves to the right when the right button is pressed and to the left when the left button is pressed. The horizontal line 33 moves up when the up button is pressed and down when the down button is pressed.

By pressing the right button on the up, down, left, right button 5, the user causes the next item of picture-taking advice to be displayed on the display screen of the liquid crystal display device 9. By pressing the left button on the up, down, left, right button 5, the user causes the immediately preceding item of picture-taking advice to be displayed on the display screen of the liquid crystal display device 9.

If the right button is pressed while the cross hairs are being displayed on the display screen of the liquid crystal display device 9 (step 68), portrait picture-taking advice is displayed on the display screen of the liquid crystal display device 9 in the manner shown in FIG. 5 (step 69).

The icon 42 is lit to notify the user of the fact that the advice relating to portrait photography is being displayed. A balloon 52 is displayed in association with the icon 42. Noteworthy picture-taking advice is displayed in the balloon 52 when portrait photography is performed. Here advice is displayed so as to avoid "GROWING HORNS" (a picture in which lines emerge from the head of a person, making it seem that the subject is growing horns) and "HEAD CUT OFF" (a picture in which the horizon cuts across the neck of a person).

If the left button is pressed when the cross marks are being displayed, picture-taking advice shown in FIG. 8 (described later) is displayed on the display screen of the liquid crystal display device 9.

If the user presses the left button (step 70) when portrait picture-taking advice is being displayed, group picture-taking advice of the kind shown in FIG. 6 is displayed on the display screen of the liquid crystal display device 9 (step 71).

The icon 43 is lit to notify the user of the fact that the advice relating to group photography is being displayed. A balloon 53 is displayed in association with the icon 43. Picture-taking advice is displayed in the balloon 53 so as to avoid "FACING MISSING" (meaning that the face of a person on one end is missing). Further, arrows 54 are caused to flash in order to call the attention of the user to the ends of the picture-taking area. By taking a group photograph while taking note of the picture-taking advice, the user is prevented from leaving out the face of a person in the group.

If the left button is pressed while portrait picture-taking advice is being displayed (step 70), the cross hairs are again displayed on the display screen of the liquid crystal display device 9, as shown in FIG. 4.

Figure 7:
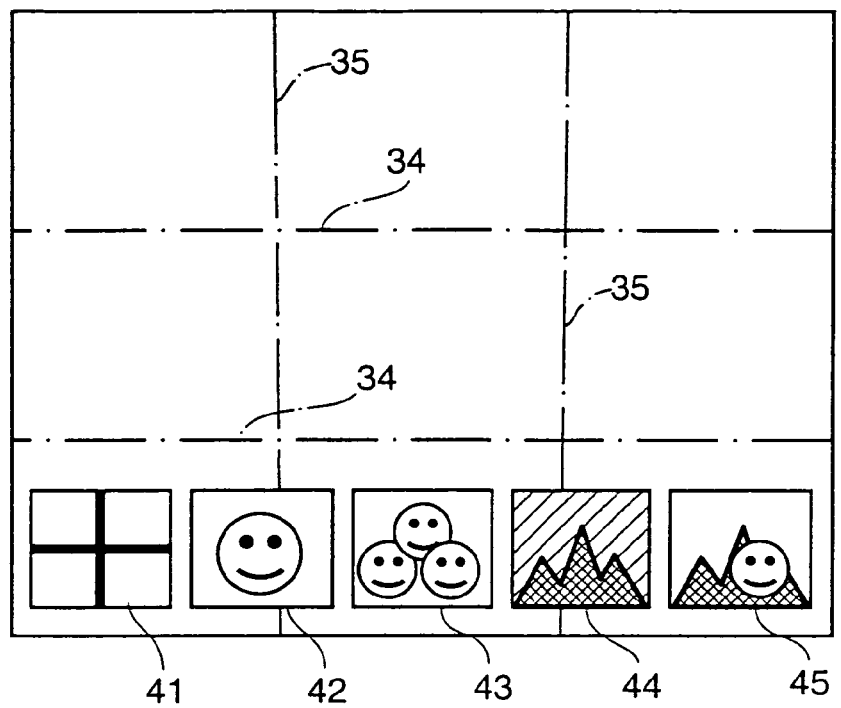

If the right button is pressed while the group picture-taking advice is being displayed (step 72), two horizontal lines 34 for dividing the picture-taking area into three sections vertically and two vertical lines 35 for dividing the picture-taking area into three sections horizontally are displayed on the liquid crystal display device 9 (step 73) so as to obtain a composition that is in accordance with the intersection-of-thirds method, as shown in FIG. 7. A monotonous composition of scenery can be prevented by deciding the composition in accordance with the two horizontal lines 34 and two vertical lines 35. The icon 44 is lit to notify the user of the fact that picture-taking advice relating to a scenic photograph is being displayed.

If the left button is pressed while the group picture-taking advice is being displayed (step 72), portrait picture-taking advice is displayed on the display screen of the liquid crystal display device 9 in the manner shown in FIG. 5.

Figure 8:
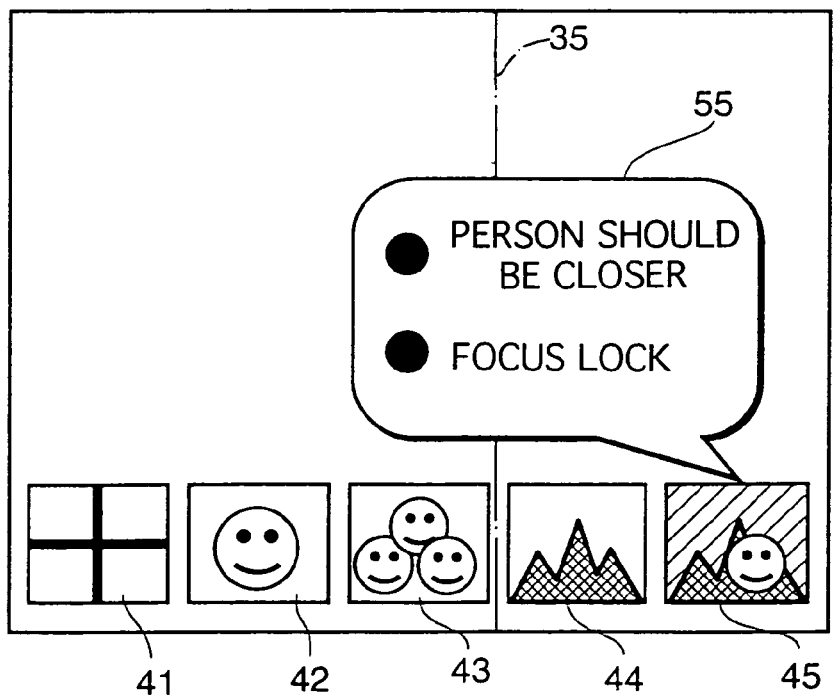

If the right button is pressed while the scenic advice is being displayed (step 74), advice relating to photography of a combination of scenery and people is displayed on the display screen of the liquid crystal display device 9 in the manner shown in FIG. 8 (step 1175). In a case where a person is photographed together with scenery, a vertical line 35 for determining the proportion of the person in the picture-taking area is displayed so as to avoid a situation in which the size of the person becomes too small. The icon 45 is lit to notify the user of the fact that the advice relating to photography of a person is being displayed. A balloon 55 is displayed in association with the icon 45. "PERSON SHOULD BE CLOSER" (prevents the image of the person from becoming too small because the person is to far away) and "FOCUS LOCK" (draws attention to the fact that the camera is focus on the person) is displayed in the balloon 55.

If the left button is pressed while the scenic advice is being displayed (step 74), group picture-taking advice of the kind shown in FIG. 6 is displayed on the display screen of the liquid crystal display device 9 (step 71).

If the right button is pressed by the user while the advice relating to photography of a combination of scenery and people is being displayed (step 76), the cross hairs shown in FIG. 4 are again displayed on the display screen of the liquid crystal display device 9. If the left button is pressed by the user while the advice relating to photography of both scenery and people is being displayed (step 76), the two horizontal lines 34 and two vertical lines 35 shown in FIG. 7 are again displayed on the display screen of the liquid crystal display device 9 (step 73).

By pressing the shutter-release button 2 after deciding composition in accordance with this picture-taking advice, the image data that has been obtained by photography is recorded on the memory card 25.

FIG. 11 illustrates another example of a display presented on the display screen of the liquid crystal display device 9.

The data representing the above-mentioned picture-taking advice is stored in the ROM 18 in advance. However, it is also possible to adopt an arrangement in which data representing other picture-taking advice is read in the camera and displayed on the liquid crystal display device 9. In this case, picture-taking advice is divided into advice for beginner, intermediate and advanced users and the required picture-taking advice is displayed on the display screen of the liquid crystal display device 9. The memory which stores the data representing the picture-taking advice would employ a RAM rather than a ROM as a matter of course.

By way of example, data representing picture-taking advice that has been stored in the memory beforehand serves as picture-taking advice for beginners. Data representing picture-taking advice added on later serves as advice for intermediate users. The data representing picture-taking advice for intermediate users that has been stored on a memory card is read from the memory card and written to a RAM within the camera.

In the set-up mode, a screen of the kind shown in FIG. 11 is displayed on the liquid crystal display device 9. In a case where the up, down, left, right button 5 is used to display picture-taking advice for beginners on the display screen of the liquid crystal display device 9 in the manner described above, the pertinent setting is turned on (indicated at 31A in FIG. 11). In a case where advice for intermediate users is displayed on the display screen of the liquid crystal display device 9, the pertinent setting is turned on (indicated at 31B in FIG. 11).

By establishing the shooting mode in the manner described above, picture-taking advice for beginners and picture-taking advice for intermediate users is displayed on the display screen of the liquid crystal display device 9 in accordance with depression of the up, down, left, right button 5. Thus, picture-taking advice in accordance with the photographic skill level of the user is displayed on the display screen of the liquid crystal display device 9.

It goes without saying that only one type of advice, namely the picture-taking advice for beginners or the picture-taking advice for intermediate users, can be displayed at one time.

(2) Second Embodiment

FIGS. 12 to 20 illustrate a second embodiment of the present invention. In the second embodiment, the construction of the digital still camera can be the same as that of the first embodiment.

In the second embodiment, advice codes indicating the types of advice described above are recorded on a memory card in addition to the image data representing the image of a subject.

Figures 12, 13:
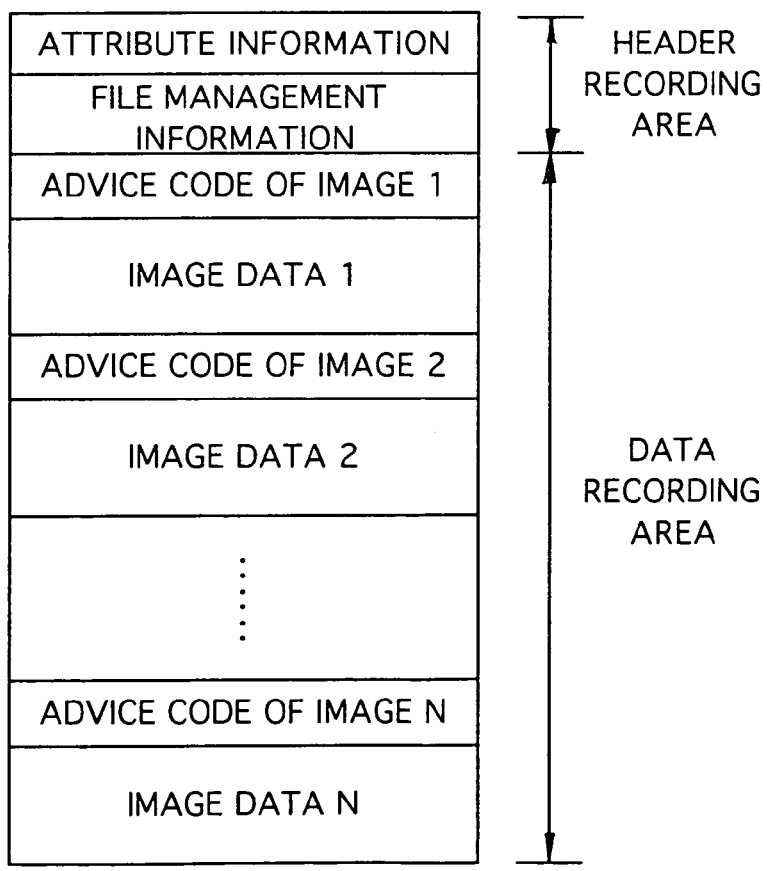
FIG. 12 is a code table indicating the correspondence between advice modes and advice codes.
FIG. 13 illustrates the data structure of a memory card.

FIG. 12 illustrates a code table.

The code table indicates the correspondence between advice modes and advice codes indicative of the advice modes. The data representing this code table is stored in the ROM 18. Here the advice codes employ hexadecimal numbers.

Advice codes "01H", "02H", "03H" and "04H" indicate portrait picture-taking advice, group picture-taking advice, scenic picture-taking advice and advice relating to shooting of a combination of scenery and people, respectively.

FIG. 13 illustrates the data structure of the memory card 25.

The memory card 25 includes a header recording area and a data recording area.

The header recording area stores attribute information and file management information. The attribute information is information that pertains to the memory card 25 itself. For example, this includes data representing the capacity of the memory card 25 and the speed at which data can be written to and read from the memory card 25. The file management information is information pertaining to the data that has been recorded on the memory card 25. For example, this includes data representing the amount of data that has been recorded in the data recording area.

The data recording area includes an advice-code recording area and an image-data recording area. The above-mentioned advice codes are recorded in the advice-code recording area, and image data representing the images of subjects is recorded in the image-data recording area.

Figure 14:
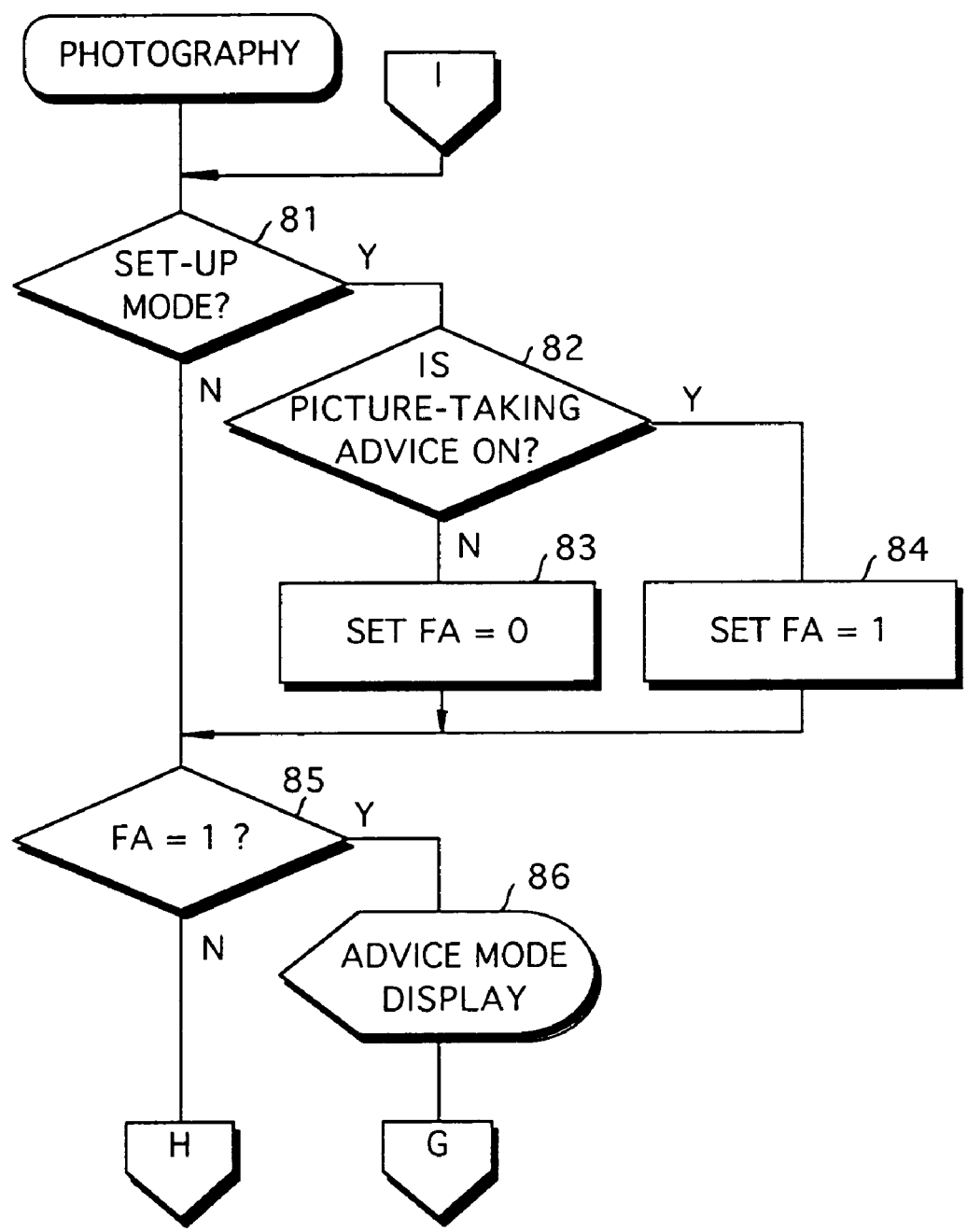
FIGS. 14 to 18 are flowcharts illustrating part of a photographic processing procedure.
Figure 15:
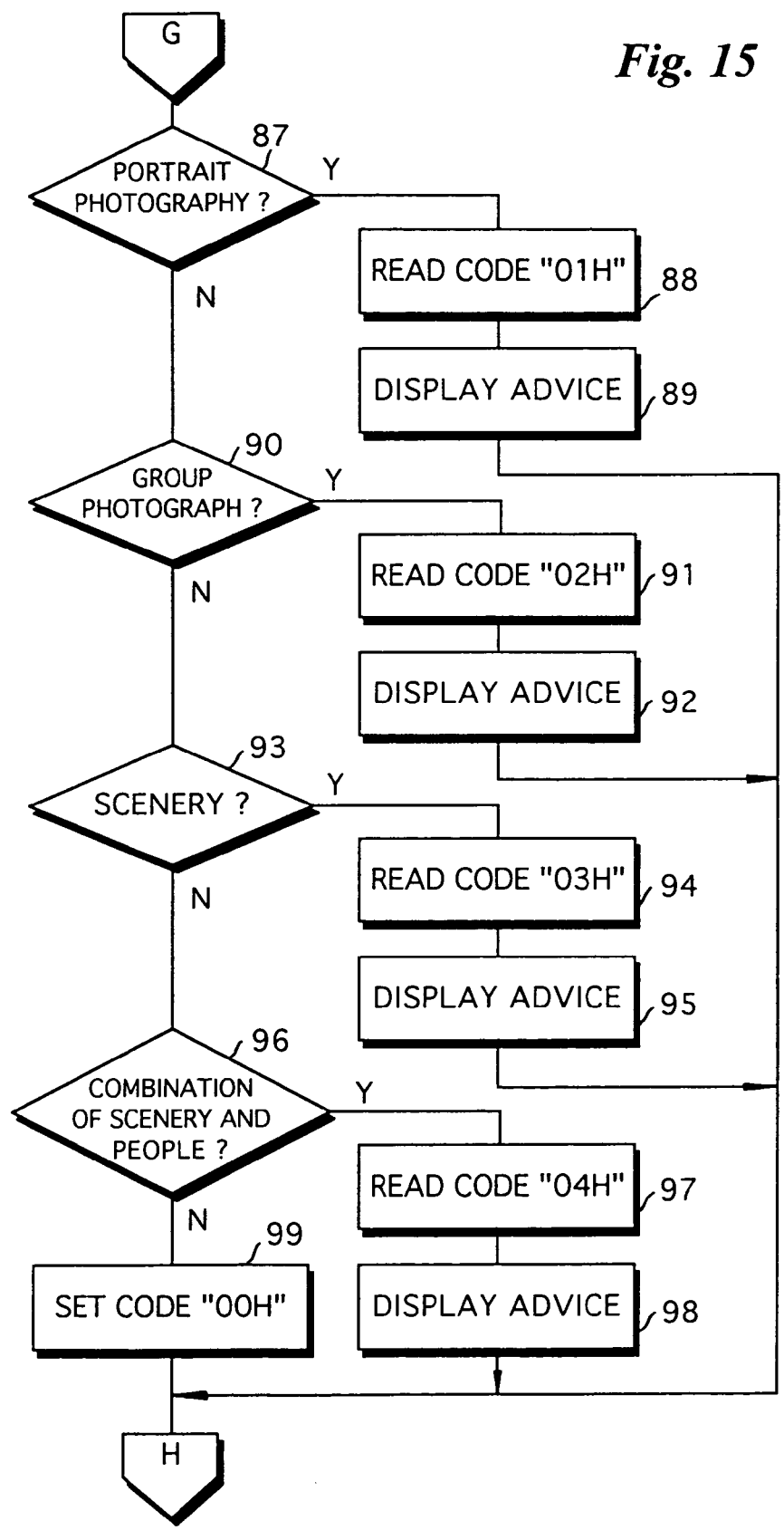
Figure 16:
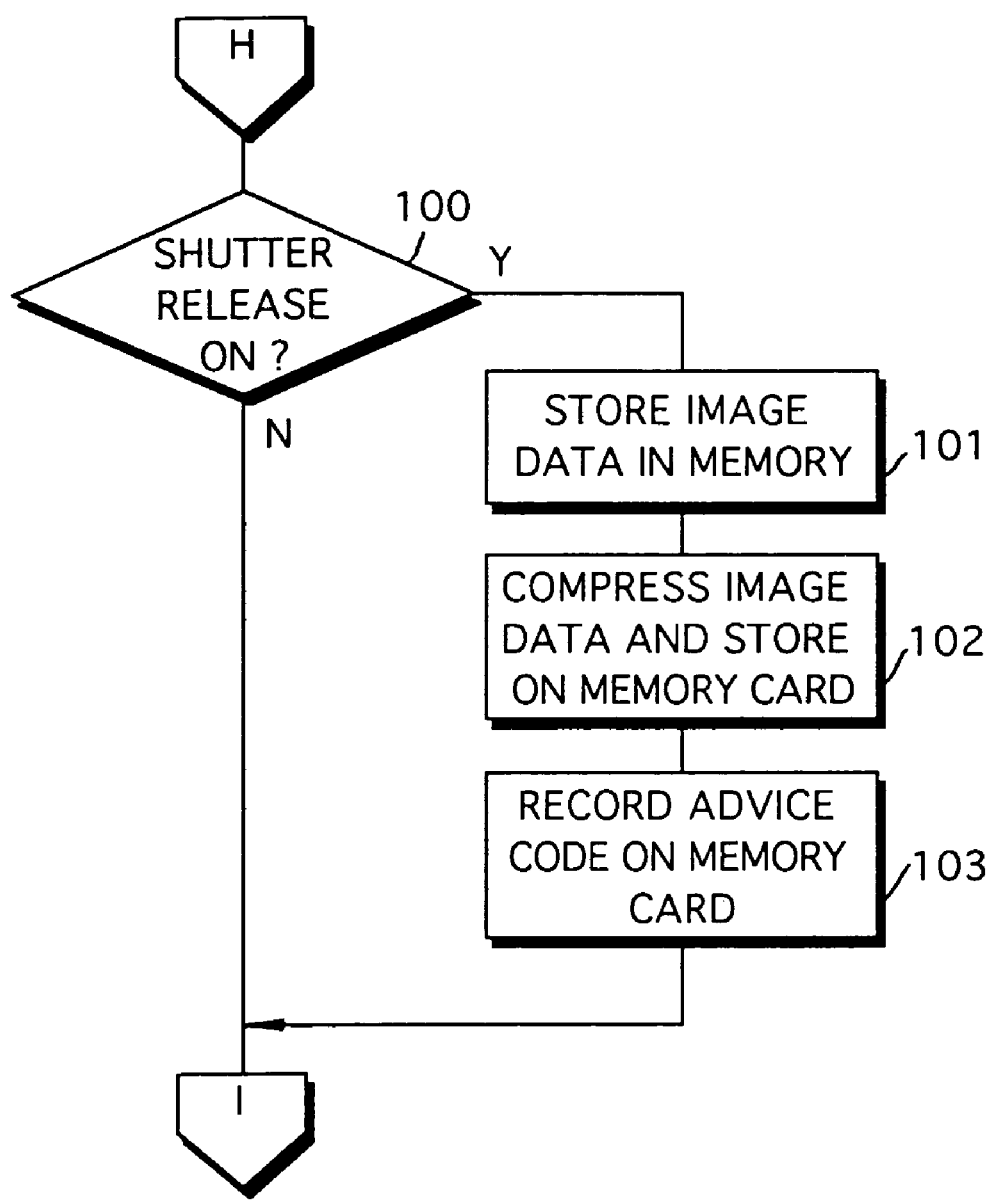

FIGS. 14 to 16 are flowcharts illustrating the procedure of processing executed at the time of photography.

If the set-up mode has been set in the manner described above ("YES" at step 81), it is determined whether picture-taking advice has been set to the ON state (step 82). If picture-taking advice has been set to the ON state ("YES" at step 82), then an advice flag FA is set to 1 (step 84). If picture-taking advice has not been set to the ON state ("NO" at step 82), then the advice flag FA is set to 0 (step 83).

It is determined whether the advice flag FA has been set to 1 (step 85). If the advice flag FA has been set to 1 ("YES" at step 85), icons 42 to 45 among the icons 41 to 45 shown in FIG. 4 are displayed on the display screen of the liquid crystal display device 9 (step 86; advice mode display). It is of course permissible to display the icon 41 as well.

If the icon 42 is selected in the above-described manner to set the advice relating to portrait photography ("YES" at step 87), then advice code "01H" is read out of the ROM 18 (step 88). The picture-taking advice conforming to portrait photography is displayed on the display screen of the liquid crystal display device 9 in the manner shown in FIG. 5 (step 89).

If the icon 43 is selected to set the picture-taking advice for a group photograph ("YES" at step 90), then advice code "02H" is read out of the ROM 18 (step 91). The picture-taking advice conforming to group photography is displayed on the display screen of the liquid crystal display device 9 in the manner shown in FIG. 6 (step 92).

If the icon 44 is selected to set the picture-taking advice for scenery ("YES" at step 93), then advice code "03H" is read out of the ROM 18 (step 94). The picture-taking advice conforming to scenic photography is displayed on the display screen of the liquid crystal display device 9 in the manner shown in FIG. 7 (step 95).

If the icon 45 is selected to set the picture-taking advice relating to a combination of scenery and people ("YES" at step 96), then advice code "04H" is read out of the ROM 18 (step 97). The picture-taking advice conforming to photography of a combination of scenery and people is displayed on the display screen of the liquid crystal display device 9 in the manner shown in FIG. 8 (step 98).

If no icon is selected ("NO" at steps 87, 90, 93 and 96), code "00H" indicating photography without picture-taking advice is set (step 99).

If the shutter-release button 2 is pressed by the user ("YES" at step 100), the image data obtained by shooting the subject in the manner described above is stored in the memory 22 temporarily (step 101). The image data is read out of the memory 22 and applied to the digital signal processing circuit 17, where the image data undergoes data compression processing (step 102). The compressed image data is read out of the digital signal processing circuit 17 and applied to the memory card 25. The compressed image data is recorded in the data recording area of the memory card 25.

The advice code "01H", "02H", "03H" or "04H" read out of the ROM 18 or the advice code "00H" that has been set is recorded in the advice-code recording area of data recording area of the memory card 25 in correspondence with the image data (step 103).

Thus, image data and advice codes are recorded on the memory card 25.

Figure 17:
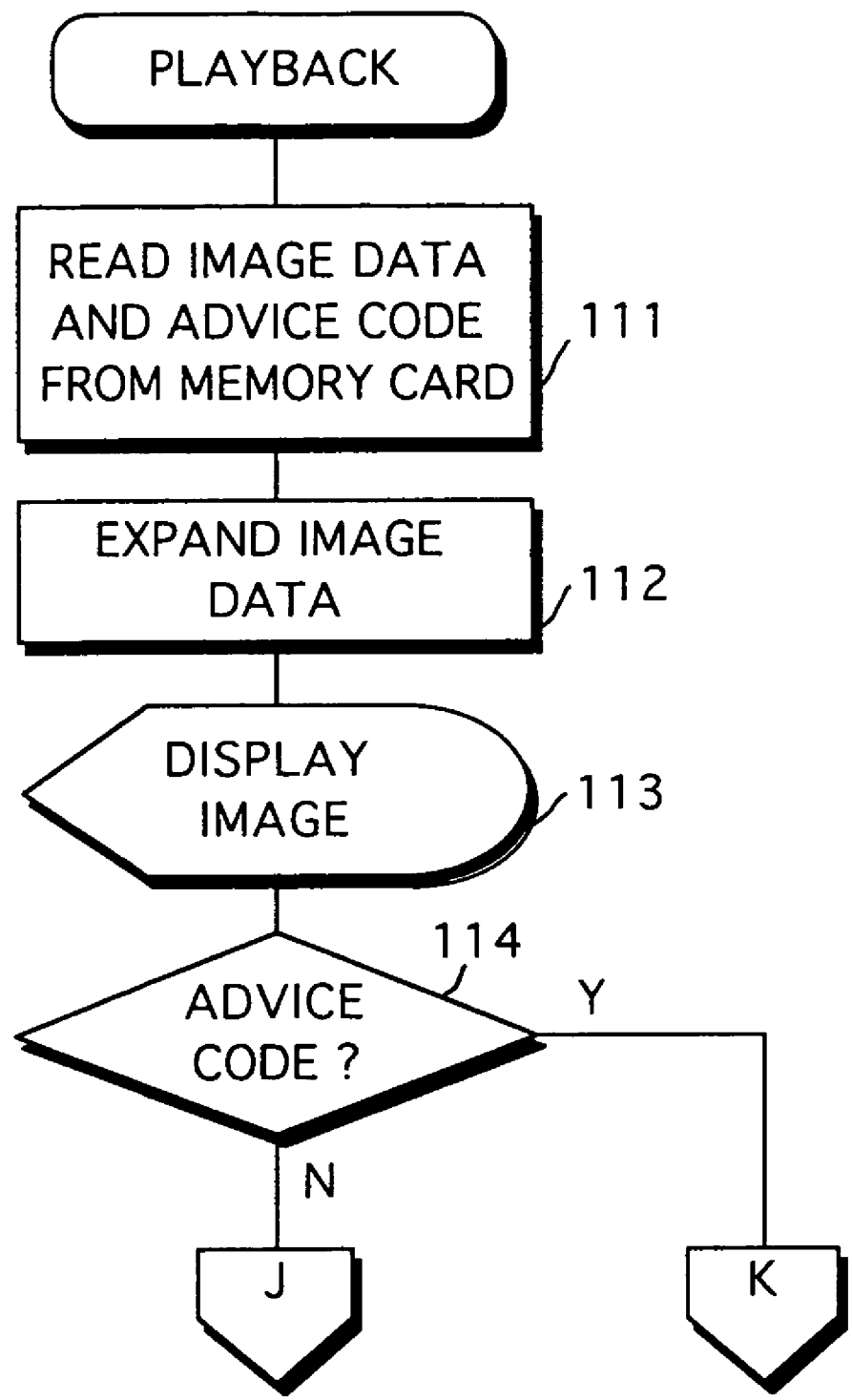
Figure 18:
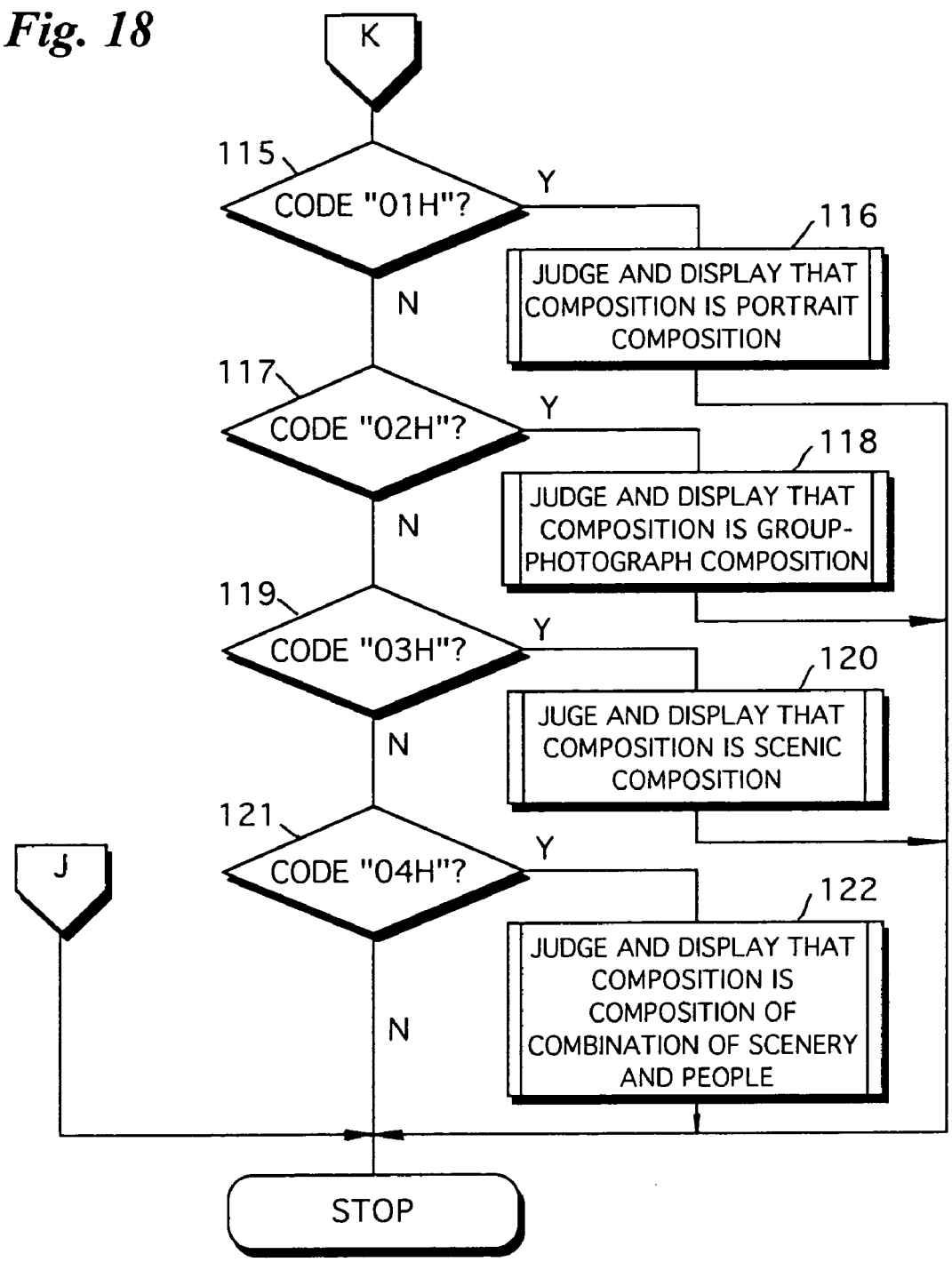
Figure 19:
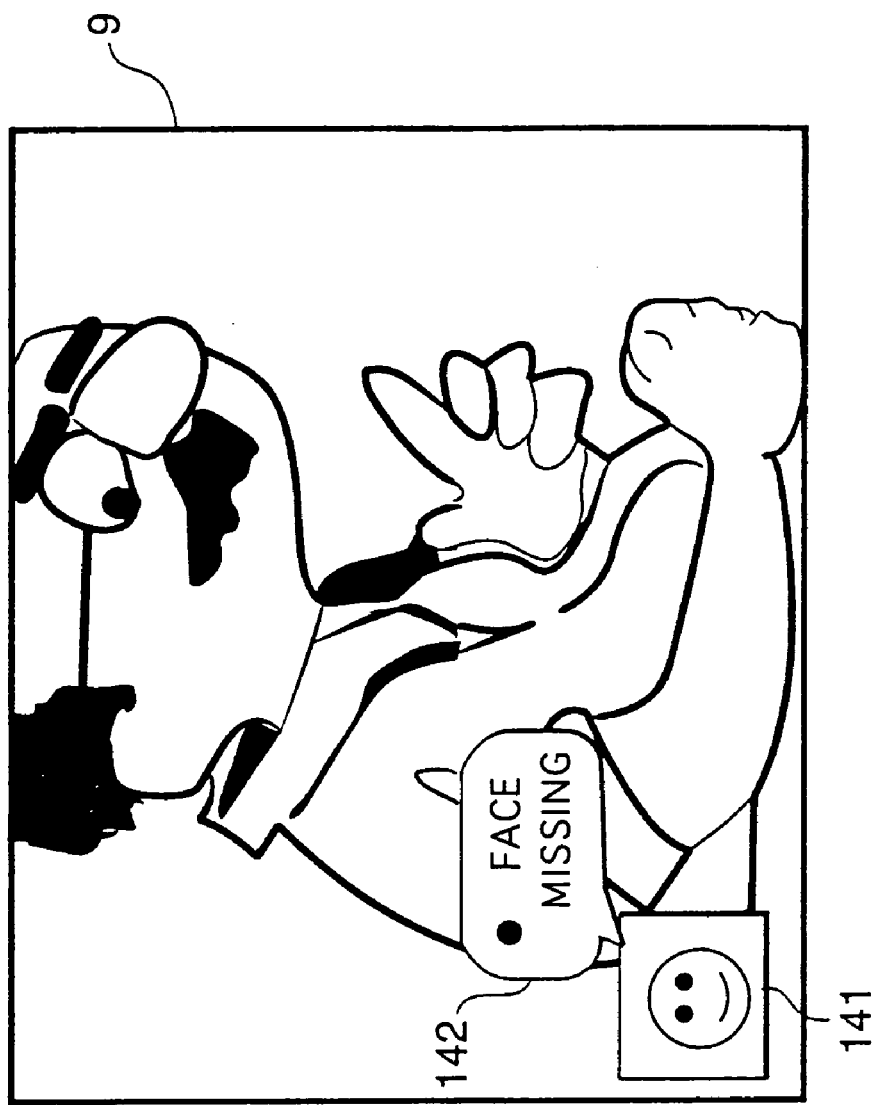
FIG. 19 illustrates an example of a display screen.

FIGS. 17 and 18 are flowcharts illustrating the procedure of processing for reproducing images. FIG. 19 illustrates an example of an image displayed on the display screen of the liquid crystal display device 9.

Compressed image data and advice data that has been recorded on the memory card 25 is read (step 111). The compressed image data read out of the memory card 25 is applied to the digital signal processing circuit 17, where the data undergoes data expansion (step 112). The expanded image data is applied to the liquid crystal display device 9 so that the image of the subject represented by the image data is displayed on the display screen (step 113).

Advice codes have been recorded on the memory card 25. If an advice code is read out ("YES" at step 114), the content of the read advice code is evaluated (steps 115, 117, 119, 121).

If an advice code is "01H" ("YES" at step 115), this indicates that the subject was shot in accordance with portrait advice. As a consequence, an icon 141 indicating that shooting was performed in accordance with portrait advice is displayed in addition to the image of the subject, as shown in FIG. 19 (judge that composition is portrait composition; step 116).

Further, it is determined whether the image of the subject being displayed on the display screen of the liquid crystal display device 9 has been captured with an appropriate composition that is in accordance with the picture-taking advice (advice relating to portrait photography in this case). When the image has not been captured with the appropriate composition, a warning 142 is displayed.

Part of the face of the image of the subject shown in FIG. 19 has been cut off ("FACE MISSING"). For this reason the warning 142 to the effect that part of the face is missing is displayed. By observing the warning 142, the user is capable of shooting the subject again as necessary.

If an advice code is "02H" ("YES" at 117), this indicates that the subject was shot in accordance with group picture-taking advice. As a consequence, an icon (not shown) indicating that shooting was performed in accordance with group picture-taking advice is displayed on the display screen of the liquid crystal display device 9. In this case also it is determined whether shooting has been performed with an appropriate composition that is in accordance with the group picture-taking advice. When the image has not been captured with the appropriate composition, a warning is displayed (step 118).

If an advice code is "03H" ("YES" at 119), this indicates that the subject was shot in accordance with scenic picture-taking advice. As a consequence, an icon indicating that shooting was performed in accordance with scenic picture-taking advice is displayed on the display screen of the liquid crystal display device 9. In this case also it is determined whether shooting has been performed with an appropriate composition that is in accordance with the scenic picture-taking advice. When the image has not been captured with the appropriate composition, a warning is displayed (step 120).

If an advice code is "04H" ("YES" at 121), this indicates that the subject was shot in accordance with picture-taking advice relating to a combination of scenery and people. As a consequence, an icon indicating that shooting was performed in accordance with picture-taking advice relating to a combination of scenery and people is displayed on the display screen of the liquid crystal display device 9. In this case also it is determined whether shooting has been performed with an appropriate composition that is in accordance with picture-taking advice relating to a combination of scenery and people. When the image has not been captured with the appropriate composition, a warning is displayed (step 122).

Thus, regardless of the type of composition, it can be ascertained with comparative ease whether photography is being performed with the appropriate composition. If photography is not being performed with the desired composition, then the user can perform photography again.

Figure 20:
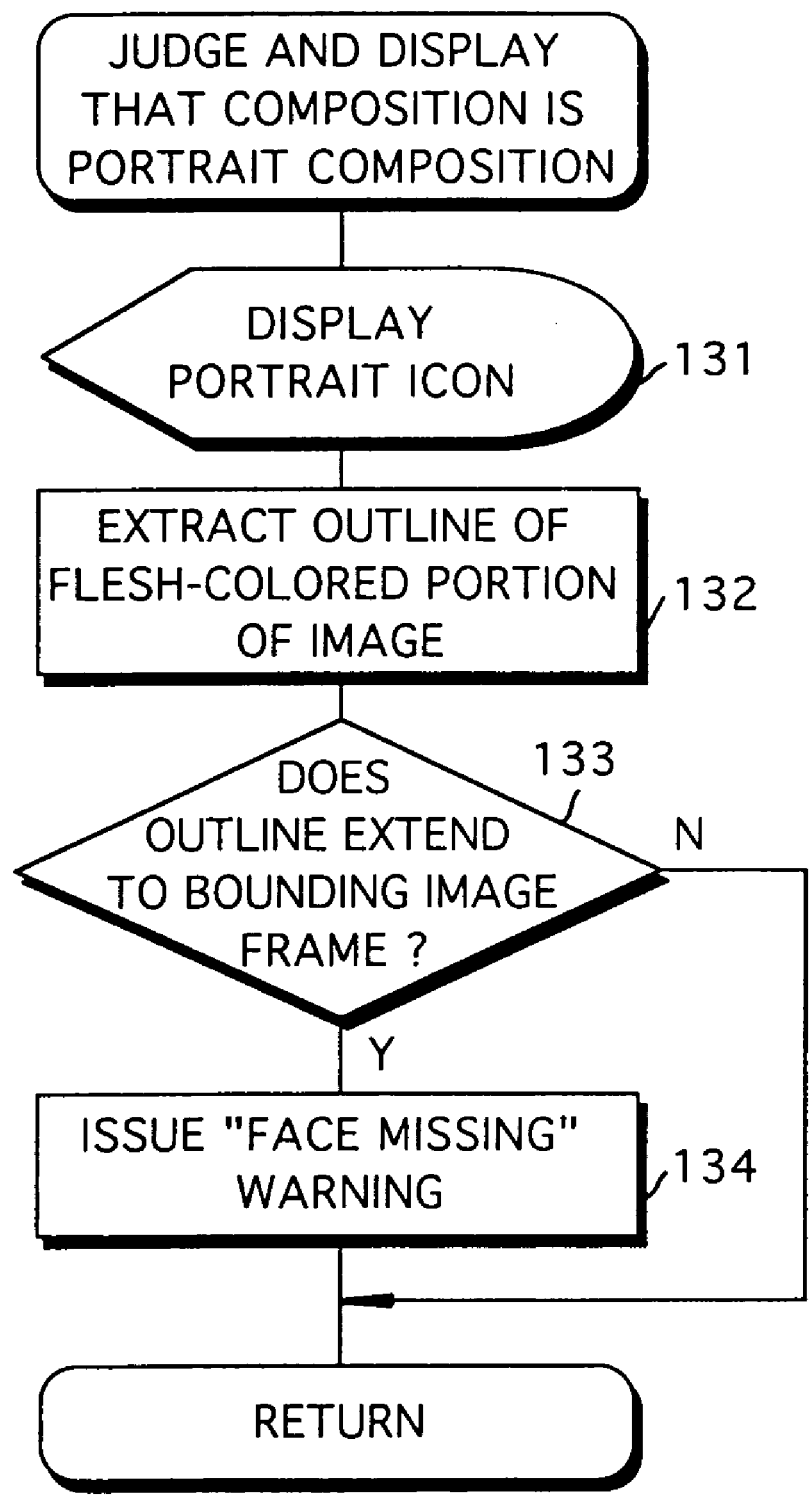
FIG. 20 is a flowchart illustrating the procedure of processing for judging and displaying portrait composition.

FIG. 20 is a flowchart illustrating the procedure of processing for judging and displaying portrait composition (the processing of step 116 in FIG. 18).

First, the portrait icon 141 is displayed on the display screen of the liquid crystal display device 9 (step 131). Next, from the image of the subject being displayed on the display screen of the liquid crystal display device 9, the outline of that portion of the image that is flesh colored is extracted (step 132). In the case of portrait photography, the flesh-colored image portion is considered to be the face portion of the person who is the main subject. Accordingly, the face portion of the person is extracted by this outline extraction.

It is determined whether the extracted outline extends to the image frame that bounds the liquid crystal display device 9 (step 133). If the extracted outline extends to the bounding image frame of the liquid crystal display device 9 ("YES" at step 133), then it is construed that part of the face of the image of the subject being displayed on the liquid crystal display device 9 is missing. As a result, the user is warned, by the warning 142 "FACE MISSING", of the fact that part of the face of the image of the subject being displayed on the liquid crystal display device 9 is missing (step 134).

Though the above-described example relates to a case in which a "FACE MISSING" warning is issued, other warnings can be presented in a similar manner.

For example, if the condition of the displayed image is "GROWING HORNS", the flesh-colored portion of the image is extracted and so is the outline regarding the overall image of the subject, and an evaluation can be made based upon whether a rod-shaped image portion is being displayed above and projecting from the flesh-colored image portion that has been extracted. Further, if the condition of the displayed image is "HEAD CUT OFF", the flesh-colored image portion is extracted and so is the outline regarding the overall image of the subject, and an evaluation can be made based upon whether a line extends horizontally with respect to the flesh-colored image portion.

Further, with regard to whether photography is being performed with a composition suited to scenic photography, the brightness and color distribution of the overall image of the subject are evaluated and an evaluation can be made based upon whether the overall image of the subject has been divided into approximately three portions in the horizontal or vertical direction. Furthermore, in regard to a combination of scenery and a person, the flesh-colored portion of the image is extracted and an evaluation can be made based upon the size of the extracted flesh-colored portion of the image and the size of the overall image of the subject. If the extracted flesh-colored portion of the image is smaller than the size of the overall image of the subject, then it is judged that the photography being performed does not apply to a composition that is a combination of scenery and people.

As many apparently widely different embodiments of the present invention can be made without departing from the spirit and scope thereof, it is to be understood that the invention is not limited to the specific embodiments thereof except as defined in the appended claims.

What is claimed is:

1. A digital camera having a function for giving advice on composition, comprising:
    an imaging unit for sensing an image of a subject and outputting image data representing the image of the subject;
    a display unit for displaying the image of the subject represented by the image data output from said imaging unit;
    a display controller for controlling said display unit so as to display the advice on composition for the purpose of taking a picture of the subject;
    a controller configured to set a photographic skill level of a user based on a photographic skill level selection from the user; and
    a recording controller responsive to depression of a shutter-release button for recording the image data, which is output from said imaging unit, on a recording medium,
    wherein said display controller controls the display unit so as to display the advice prior to recording the image data to the recording medium,
    wherein the advice is a textual warning message of a potential defect of the composition,
    wherein the advice is based on a current picture taking mode selected by the user and based on the photographic skill level of the user,
    wherein the photographic skill level of the user is selectable between a first photographic skill level and a second photographic skill level such that first advice data corresponding to the first photographic skill level are different from second advice data corresponding to the second photographic skill level, and
    wherein the display controller retrieves the advice from the first advice data when the first photographic skill level is selected and retrieves the advice from the second advice data when the second photographic skill level is selected.

2. The camera according to claim 1, further comprising a display command switch for applying a command to display the advice, wherein said display controller causes said display unit to display the advice in response to the display command applied by said display command switch.

3. The camera according to claim 1, further comprising an icon display controller for controlling said display unit in such a manner that an icon representing the image of the subject that is applicable to a composition is displayed in association with the advice.

4. The camera according to claim 1, further comprising a device for setting the photographic skill level.

5. The camera according to claim 1, wherein said recording controller records data representing the advice on the recording medium in correlation with the image data.

6. The camera according to claim 1, wherein the display controller dynamically provides the warning message based on the current picture taking mode.

7. The camera according to claim 6, wherein the display controller dynamically provides the warning message further based on a current state of the image of the subject.

8. The camera according to claim 1, wherein the display controller displays a plurality of image icons simultaneously on the display unit, wherein each image icon corresponds to one of a plurality of picture taking modes, and wherein an image icon corresponding to the current picture taking mode of the plurality of picture taking modes is highlighted.

9. The camera according to claim 8, wherein the display controller dynamically displays the advice based the current picture talking mode and a current state of the image.

10. The camera according to claim 1, further comprising a navigation button, wherein the display controller controls the display unit so as to display a cross hair and to move the cross hair based on movement commands entered by the user via the navigation button prior to the user selecting the current picture taking mode.

11. The camera according to claim 10, wherein the display controller controls the display unit to display the cross hair when the user selects a picture advice mode to be on.

12. The camera according to claim 10,
    wherein the current picture taking mode is one of a plurality of picture taking modes, and
    wherein the plurality of picture taking modes include at least two of a portrait picture taking mode, a group picture taking mode, a scenic picture taking mode, and a scenic-people picture taking mode.

13. The camera according to claim 12, wherein when the current picture taking mode is the scenic picture taking mode, the display controller controls the display unit so as to display one or more horizontal lines and one or more vertical lines.

14. The camera according to claim 13, wherein the one or more horizontal lines and the one or more vertical lines allows the user to obtain the image in accordance with an intersection-of-thirds method.

15. The camera according to claim 12, wherein when the current picture taking mode is the scenic-people picture taking mode, the advice warns of a person being too small ("person should be closer") or warns that a focus should be on a person ("focus lock") or both.

16. The camera according to claim 1, further comprising:
    a RAM configured to store the first advice data and the second advice data,
    wherein the first advice data are initially stored in the RAM, and
    wherein the second advice data are subsequently added in the RAM after the initial storage of the first advice data in the RAM.

17. The camera according to claim 1, wherein the first advice data corresponding to the current picture taking mode are different from the second advice data corresponding to the current picture taking mode.

18. An image reproducing apparatus, comprising:
a reading unit for reading advice data and image data from a recording medium, wherein the advice data represents an advice on composition for the purpose of taking a picture of a subject and the image data represents the image of the subject, the advice data and the image data being recorded on the recording medium in correlation with each other, wherein the advice having been determined prior to capturing the image of the subject, wherein one or more textual warning messages corresponding to the advice data was provided prior to capturing the image of the subject and wherein the advice is based on a picture taking mode selected by a user and based on a photographic skill level of the user, wherein the photographic skill level of the user was selected between a first photographic skill level and a second photographic skill level such that first advice data corresponding to the first photographic skill level are different from second advice data corresponding to the second photographic skill level;
a first display controller for controlling a display unit in such a manner that the image of the subject, which is represented by the image data that has been read by said reading unit, is displayed on a display screen of the display unit; and
a second display controller for controlling the display unit in such a manner that the advice indicated by the advice data that has been read by said reading unit is displayed on the display screen of the display unit.

19. The apparatus according to claim 18, further comprising:
a determination unit for determining whether the image of the subject displayed on a basis of control by said first display controller has been captured with a composition that is in accordance with the advice; and
a warning unit for issuing a warning in response to a determination by said determination unit to the effect that the image of the subject has not been captured with the composition that is in accordance with the advice.

20. The apparatus according to claim 18, wherein the one or more warning messages were dynamically provided based on the picture taking mode of the image data prior to the time the image data was captured.

21. The apparatus according to claim 20, wherein the one or more warning messages were dynamically provided further based on a current state of the image of the subject prior to the time the image data was captured.

22. The apparatus according to claim 18, wherein the one or more textual warning messages warned the user of one or more potential defects of the composition.

23. The apparatus according to claim 18, wherein the first advice data corresponding to the picture taking mode are different from the second advice data corresponding to the picture taking mode.

24. A method of controlling operation of a digital still camera having a function for giving advice on composition, the camera having an imaging unit for sensing the image of a subject and outputting image data representing the image of the subject, a display unit for displaying the image of the subject represented by the image data output from the imaging unit, and a recording controller responsive to a depression of a shutter-release button for recording the image data, which is output from said imaging unit, on a recording medium, said method comprising:

controlling the display unit so as to display advice on a composition for the purpose of taking a picture of the subject prior to recording the image data to the recording medium,
wherein the advice is a textual warning message of a potential defect of the composition, and
wherein the advice is based on a current picture taking mode selected by a user and based on a photographic skill level of the user, the photographic skill level of the user based on a photographic skill level selection from the user, wherein the photographic skill level of the user is selectable between a first photographic skill level and a second photographic skill level such that first advice data corresponding to the first photographic skill level are different from second advice data corresponding to the second photographic skill level; and retrieving the advice from the first advice data when the first photographic skill level is set and retrieving the advice from the second advice data when the second photographic skill level is selected.

25. The method according to claim 24, wherein the warning message is dynamically provided based on the current picture taking mode.

26. The method according to claim 25, wherein the warning message are dynamically provided further based on a current state of the image of the subject.

27. The method according to claim 24, further comprising:
initially storing the first advice data in a RAM of the digital still camera; and
adding the second advice data in the RAM after the initial storage of the first advice data in the RAM.

28. The method according to claim 24, wherein the first advice data corresponding to the current picture taking mode are different from the second advice data corresponding to the current picture taking mode.

29. An image reproduction method, comprising the steps of:
reading advice data and image data from a recording medium, wherein the advice data represents an advice on composition for the purpose of taking a picture of a subject and the image data represents the image of the subject, the advice data and the image data being recorded on the recording medium in correlation with each other, wherein the advice having been determined prior to capturing the image of the subject, wherein one or more textual warning messages corresponding to the advice data were provided prior to capturing the image of the subject, and wherein the advice is based on a picture taking mode selected by a user and based on a photographic skill level of the user, the photographic skill level of the user was selected between a first photographic skill level and a second photographic skill level such that first advice data corresponding to the first photographic skill level are different from second advice data corresponding to the second photographic skill level; and
displaying the image of the subject, which is represented by the image data that has been read, and the advice indicated by the advice data that has been read, on a display screen of the display unit.

30. The image reproduction method according to claim 29, further comprising:
determining whether the image of the subject displayed on the display screen has been captured with a composition that is in accordance with the advice; and issuing a warning in response to a determination that the image of the subject has not been captured with the composition that is in accordance with the advice.

31. The method according to claim 29, wherein the one or more warning messages were dynamically provided based on the picture taking mode of the image data prior to the time the image data was captured.

32. The method according to claim 31, wherein the one or more warning messages were dynamically provided further based on a current state of the image of the subject prior to the time the image data was captured.

33. The image reproduction method according to claim 29, wherein the textual warning message of the advice warned the user of a potential defect of the composition.

34. The image reproduction method according to claim 29, wherein the first advice data corresponding to the picture taking mode are different from the second advice data corresponding to the picture taking mode.

35. A digital camera having a function for giving advice on composition, comprising:
   an imaging unit for sensing an image of a subject and outputting image data representing the image of the subject;
   a display unit for displaying the image of the subject represented by the image data output from said imaging unit;
   a display controller for controlling said display unit so as to display the advice on composition for the purpose of taking a picture of the subject; and
   a recording controller responsive to depression of a shutter-release button for recording the image data, which is output from said imaging unit, on a recording medium,
   a navigation button, wherein the display controller controls the display unit so as to display a cross hair and to move the cross hair based on movement commands entered by the user via the navigation button prior to the user selecting the current picture taking mode;
   wherein said display controller controls the display unit so as to display the advice prior to recording the image data to the recording medium,
   wherein the advice is a textual warning message of a potential defect of the composition, and
   wherein the advice is based on a current picture taking mode selected by a user and based on a photographic skill level of the user,
   wherein the current picture taking mode is one of a plurality of picture taking modes,
   wherein the plurality of picture taking modes include at least two of a portrait picture taking mode, a group picture taking mode, a scenic picture taking mode, and a scenic-people picture taking mode, and
   wherein when the current picture taking mode is the portrait picture taking mode, the advice warns of a line or lines emerge from a head of a person ("growing horns") or warns of a horizon cutting across a neck of a person ("head cut off") or both.

36. A digital camera having a function for giving advice on composition, comprising:
   an imaging unit for sensing an image of a subject and outputting image data representing the image of the subject;
   a display unit for displaying the image of the subject represented by the image data output from said imaging unit;
   a display controller for controlling said display unit so as to display the advice on composition for the purpose of taking a picture of the subject; and
   a recording controller responsive to depression of a shutter-release button for recording the image data, which is output from said imaging unit on a recording medium,
   a navigation button, wherein the display controller controls the display unit so as to display a cross hair and to move the cross hair based on movement commands entered by the user via the navigation button prior to the user selecting the current picture taking mode;
   wherein said display controller controls the display unit so as to display the advice prior to recording the image data to the recording medium,
   wherein the advice is a textual warning message of a potential defect of the composition, and
   wherein the advice is based on a current picture taking mode selected by a user and based on a photographic skill level of the user,
   wherein the current picture taking mode is one of a plurality of picture taking modes,
   wherein the plurality of picture taking modes include at least two of a portrait picture taking mode, a group picture taking mode, a scenic picture taking mode, and a scenic-people picture taking mode, and
   wherein when the current picture taking mode is the group picture taking mode, the advice warns of a face of a person being missing ("face missing").

* * * * *